H. G. THOMPSON.
Lasting-Machine.
No. 203,673. Patented May 14, 1878.
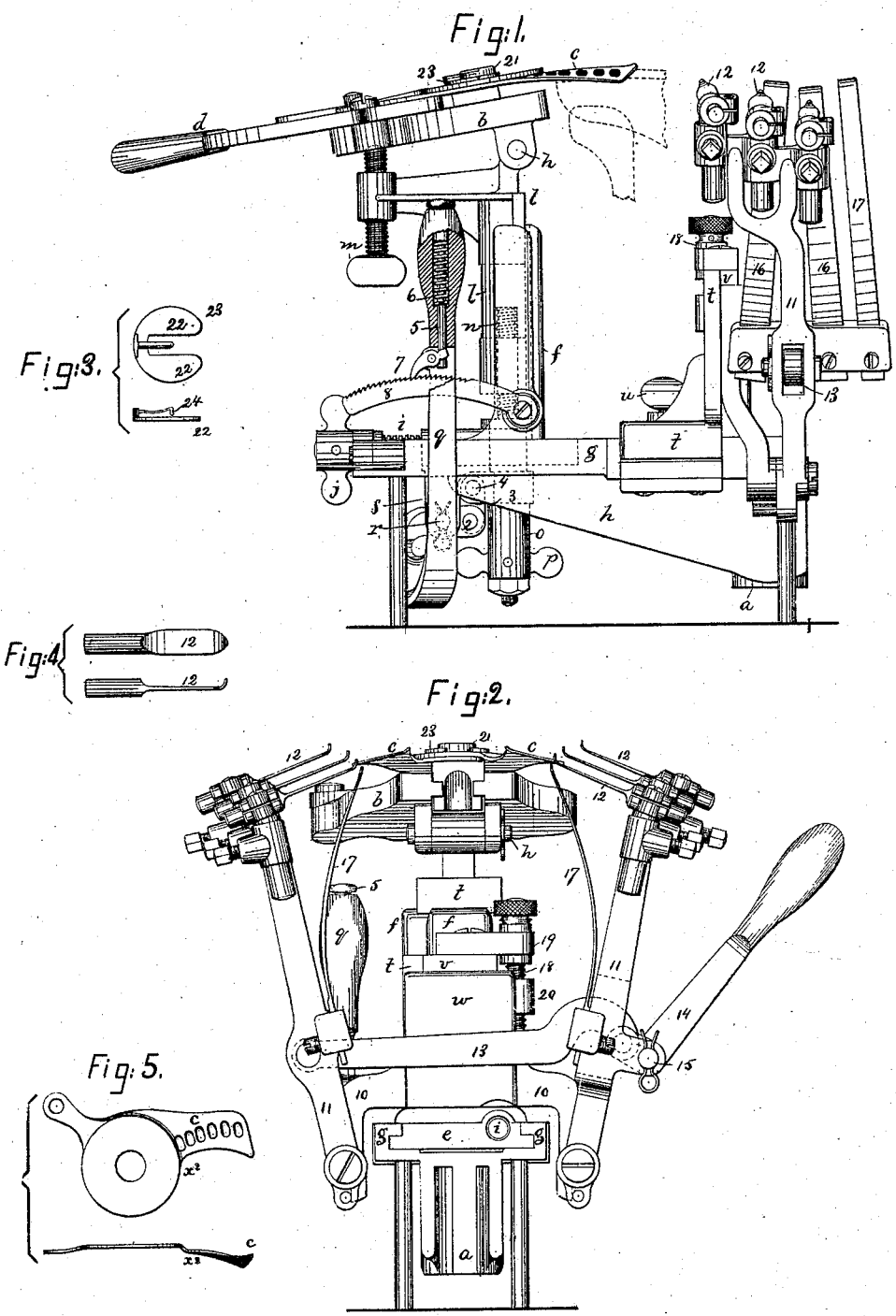
Witnesses.
E. C. Perkins.
W. J. Pratt.
Inventor
Henry G. Thompson
by Crosby & Gregory
Attys

UNITED STATES PATENT OFFICE.

HENRY G. THOMPSON, OF MILFORD, CONNECTICUT.

IMPROVEMENT IN LASTING-MACHINES.

Specification forming part of Letters Patent No. 203,673, dated May 14, 1878; application filed November 6, 1877.

*To all whom it may concern:*

Be it known that I, HENRY G. THOMPSON, of Milford, in the county of New Haven and State of Connecticut, have invented an Improved Lasting-Machine, of which the following is a specification:

This invention has reference to mechanism for lasting shoes and boots, and is an improvement on the mechanism shown in United States Patents Nos. 193,446 and 193,445.

In this present invention, as in such patents, the nails or tacks are or will preferably be driven by means of the well-known magnetic tacker.

In Patent No. 193,446 the crimping jaws or pullers are shown as held down upon the material, both when being moved forward and when the tacks are being driven, by means of a curved leaf-spring. With such a spring the edges of the upper will sometimes slip when the tacks are being driven, and the spring has to be adjusted for different-sized shoes.

To overcome the objections incident to the use of the crimping jaws or pullers and spring referred to, and insure that the jaws hold the upper firmly when the tacks are being driven, and to place the amount of strain to be put upon the upper (that being according to the material) completely under the control of the operator, I have pivoted the crimping jaws or pullers upon a vertically-adjustable slide, with which I have combined an adjusting-lever and locking device, to raise or lower the pivot of the jaws, and lock such pivot with reference to the level of the sole of the shoe. On this slide I have placed a plate-adjusting device, to adapt the under surface of the jaws or pullers to the inclination or curve of the last. To last the sides and shank of the shoe I have provided a series of fingers, to move substantially horizontally over the last-bottom, and a series of shank-springs, to bear upon the upper at the sides of the last, one pair of such springs resting on the upper opposite and outside of the corner of the heel-stiffener, thereby crowding it well and snugly into the curve of the shank. These side and shank lasting devices are made both vertically and longitudinally adjustable, to adapt them to different-sized shoes.

Figure 1 represents, in side elevation, a sufficient portion of a lasting-head to illustrate my invention; Fig. 2, an end view thereof, viewing it from the right of Fig. 1; Fig. 3, a detail, showing the device for holding the jaws upon their axes or fulcra. Fig. 4 shows a top and side elevation of one of the side-lasting fingers; and Fig. 5 shows, in top view and side elevation, one of the spring-steel crimping jaws or pullers detached.

In the drawings I have shown but half of the lasting-head, the end containing the heel-lasting jaws being omitted, as the jaws at each end of the head are alike.

The socket $a$, the pivoted supporting-plate $b$, the crimping jaws or pullers $c$, and the lever $d$ and its connections, to move the jaws forward and open and close them, are as in Patent No. 193,446.

The carriage $e$, provided with a post, $f$, fitted to slide in ways $g$ formed in the head $h$, is made longitudinally adjustable in the head by means of screw $i$, provided with a thumb-nut, $j$, in order to adapt the jaws to shoes of different lengths. The supporting-plate $b$, instead of being pivoted at its rear end, as in the patent cited, is pivoted at or near its forward end, at $h$, to the vertically-adjustable plate-carrying slide $l$, fitted to be raised and lowered with reference to the post $f$, by which it is guided.

The screw $m$, operating upon the rear end of the plate $b$, places the under sides of the crimping jaws or pullers $c$ at the proper inclination with reference to the toe or heel of the last, according to its curvature. The plate-carrying slide $l$ is provided with screw-threads to receive a screw, $n$, held in a sleeve, $o$, provided with a thumb-nut, $p$, by which the supporting-plate $b$ and jaws may be quickly adjusted in height to place the jaws on the proper level with relation to the bottom of the last.

The slide-adjusting lever $q$, a crooked lever, pivoted at $r$ to a hanger, $s$, of the carriage $e$, has its short arm 2 connected, by a small link, 3, with the slide at 4, so as to move it and the jaws vertically, to lift them above or force them down upon the shoe being lasted with more or less force. The handle or long end of this lever $q$ is provided with part of the locking device. This locking device, in this instance, is composed of a rod, 5, a spring, 6, to lift the rod, a pawl, 7, arranged to have its operating end lifted by depressing the rod, and a rack, 8, having teeth to be engaged by the pawl to lock and hold the handle and the slide and jaws in position.

The shank-lasting devices are carried by the frame $t$, made movable laterally on the guideway $g$ of the head $h$, a set-screw, $u$, fastening the same. The vertical portion of the frame $t$ is provided with a guiding-edge, $v$, to which is fitted the finger-carrying slide $w$, having ears 10, to which are pivoted the arms 11, provided at top with fingers 12, adapted to be passed from the outside of the last horizontally, or nearly so, across the edge of the last, toward the central line of the last-bottom. These fingers are preferably made of spring-steel, and are preferably so held as to be adjusted up and down and laterally with reference to the arms and last, and also so as to be turned axially to adapt them to the curves of the last; but I desire it to be understood that I do not claim such adjustment of these fingers.

One arm, 11, has pivoted to it one end of a link, 13, and the opposite end of such link is connected with the short end of a hand-lever, 14, pivoted at 15. The arms are operated to move the fingers over the last by means of this lever. When the handle of this lever is in its lowermost position the arms 11 are held locked, and the fingers are over the last. The arms 11 are also provided with upper-pressing springs 16 17, to meet the side of the upper, press it firmly against the side of the last, and place the upper in proper condition to be crowded over by the fingers, when, as the arms are closed, the fingers subsequently crowd the edge of the upper over onto the inner sole at the sides and shank of the shoe. The pair of springs 17 bear upon the upper at such a point as to also crowd the inner corners of the heel-stiffening, held between the upper and lining, into the curved portion of the shank, so that such stiffener is also correctly drawn in and lasted, and will not project out and form a shoulder at the shank.

This finger-carrying slide $w$ is made vertically adjustable, to accommodate the fingers to the level of the shoe by means of a screw, 18, held in a lug, 19, the screw fitting a nut, 20, on the slide, while for the length of the shoe the adjustment is made by the screw $u$.

The perforated crimping-jaws have their fulcra on a stud, 21, undercut at its edges, as in Fig. 2, to receive the portion 22 of a holding-plate, 23, also provided with a spring-pin, 24, (see Fig. 3,) to enter a slot in the top of the stud 21.

The holding-plate takes the place of a nut, and when removed, as may easily be done, permits the removal of the jaws from the stud 21. Such jaws, in this instance, are made entirely of spring-steel.

Operation: The upper is first placed over the last, and held by means of one or more tacks each at the toe, heel, and sides. Then the upper and last are placed in position on the usual last-holding pin in the head, the toe of the last and upper meeting the toe-rest, as shown in dotted lines.

The carriage sustaining the crimping jaws or pullers and the slide carrying the fingers are then adjusted horizontally and vertically to proper position with reference to a shoe of the length and size upon which they are to operate. The jaws in such adjusted position will be elevated, so that their pivotal points will occupy a position in a plane one-fourth to three-eighths of an inch higher than the plane which the outer or free ends of the jaws will occupy when resting upon the upper edges of the last at toe and heel, as hereinafter described.

Assuming that the operator has his left hand upon the adjusting and locking lever $q$, and his right hand on the lever $d$, for moving forward and closing the jaws, he will with one hand first throw back the adjusting-lever $q$, so as to elevate the ends of the jaws on a line with the last, and with his other hand he will then move lever $d$ to close the jaws until their downwardly-curved points or ends rest on the upper at the edge of the last. In this position the curved portions $x^2$ of the jaws will be elevated somewhat above the extreme end of the last. Then the operator will reverse the movement of lever $q$ to press the slide $l$ down until the ends and inner curved edges of the jaws press down upon the upper about the entire ends of the last, heel and toe, after which he will operate the handle or lever $d$, and move the crimping jaws or pullers forward over the last, they at the same time closing together and wiping the edges of the upper snugly about the last.

The edge of the upper is most fulled or crimped at the points of greatest curvature of the last—viz., the extreme toe and heel.

The portion $x^2$ of the jaws, near their fulcra, meet these heel and toe portions, and, being made of spring-steel, are allowed to yield back to their fulcra, which would not be the case were the ends of the jaws held in cast-iron blocks, as heretofore.

These jaws $c$ of spring-steel, curved from their outer ends to their fulcra, are adapted to bear firmly at all points on the upper below them, and spring or yield to the thickness of the crimp or plait without tearing the stock.

When the jaws are moved forward and closed, the operator, previous to tacking, will give the lever $q$ an extra pull to lower the position of the jaws, or crowd them down with additional force upon the edges of the shoe-upper so turned over, and such lever, locked by the locking devices, will hold the upper firmly under pressure and strain while the tacks are driven into the upper and inner sole.

It is obvious that the amount of strain upon the upper and the closeness of its fit to the last will depend upon the force with which the jaws are pressed down as they are moved forward and closed. This final pressure by the downward movement of the slide $l$ after the jaws are closed may be in excess of the pressure that the upper would stand while the jaws were being moved forward.

The locking devices may be modified without departing from this invention.

I claim—

1. Crimping jaws or pullers to draw over and plait in the uppers of boots and shoes, in combination with an adjusting-lever and locking devices for elevating and depressing the jaws and locking the same fast at any desired position.

2. In combination, the crimping jaws or pullers, the pivoted supporting-plate and its carrying-slide, a lever to adjust the jaws and plate vertically, and locking devices to hold them in adjusted position, substantially as set forth.

3. The crimping jaws or pullers and supporting plate, pivoted at its inner end, in combination with an adjusting device or screw to turn the plate on its pivot to adjust the jaws or pullers to conform to the shape of the last.

4. In combination, crimping jaws or pullers to draw over and plait in the uppers of boots and shoes, the supporting-plate, pivoted at its inner end, the set-screw or equivalent to adjust the outer end of the plate to give to the pullers any desired elevation or depression requisite to conform the same to the shape of the last, and devices to adjust the position of the jaws vertically and laterally.

5. The combination, in a lasting-machine, of the following instrumentalities, viz: an adjustable pivoted supporting-plate, crimping-jaws, mechanism to reciprocate the jaws longitudinally and to close them as they move forward, and an adjusting-lever adapted to be operated to press the forwardly-moving jaws down upon the upper, so that the pullers bear with a yielding pressure upon the upper while the tacks are being driven, substantially as described.

6. The combination, with the head $h$ of the machine, adapted to be supported on a swiveling jack, of shank-lasting mechanism, substantially as described, and mechanism to move all of such shank-lasting mechanism independently with relation to the toe and heel lasting devices, to adapt the shank-lasting mechanism to shoes of different sizes.

7. In a lasting-machine, the head, arms 11, shank-lasting fingers, and springs to bear upon the sides of the upper, in combination with mechanism to simultaneously adjust the arms and their fingers and springs vertically and longitudinally with relation to the head and the height and length of the last, substantially as described.

8. In a lasting-machine provided with shank-lasting mechanism, the combination, with the head carrying such shank-lasting mechanism, of a horizontally-movable frame, a vertically-movable slide, and devices to move and adjust such frame and slide horizontally and vertically to simultaneously place the shoe and the shank-lasting mechanism in operative position according to the size of the shoe.

9. In combination, the finger-carrying slide, the arms and fingers, and link and lever to close and open the arms, to operate substantially as described.

10. The jaws curved downward from their fulcra to their points or ends, in order that when pressed down upon the shoe by the adjusting-lever the jaws will yield to permit the entire inner curved portion of both jaws to act with a yielding pressure while they draw over and fit the upper to the configuration of the last.

11. Crimping jaws or pullers made entirely of sheet spring-steel, and curved, as described, from their front ends to their fulcra, to adapt themselves to the folded-over edges of the upper at the toe and heel of the last, as set forth.

In testimony whereof I have signed my name to this specification in the presence of two subscribing witnesses.

HENRY G. THOMPSON.

Witnesses:
G. W. GREGORY,
W. J. PRATT.